United States Patent [19]
Klatil et al.

[11] 3,853,827
[45] Dec. 10, 1974

[54] SELF CURING ACRYLATE TYPE COMPOSITION FOR CEMENTING METAL PARTS

[75] Inventors: Karel Klatil, Decin; Tomas Vogel, Kresin; Milos Moc; Premysl Jarolimek, both of Usti nad Labem, all of Czechoslovakia

[73] Assignee: Spolek Pro Chemickou a Hutni Vyrobu, Usti nad Labem, Czechoslovakia

[22] Filed: Jan. 25, 1972

[21] Appl. No.: 220,693

[52] U.S. Cl. ........ 260/86.1 E, 117/132, 260/89.5 R, 260/872
[51] Int. Cl. ........ C08f 3/64, C08f 3/66, C08f 15/18
[58] Field of Search .................. 260/89.5 R, 86.1 E

[56] References Cited
UNITED STATES PATENTS

| | | | |
|---|---|---|---|
| 3,041,322 | 6/1962 | Krieble | 260/89.5 R |
| 3,454,543 | 7/1969 | Rai et al. | 260/89.5 R |
| 3,551,311 | 12/1970 | Nass et al. | 260/89.5 R |

OTHER PUBLICATIONS
Rytina et al., Chem. Abs., 70, (1969), pp. 29823b.
Kiyono et al., Chem. Abs., 71, (1969), pp. 125643j.
Newman, Chem. Abs., 72, (1970), pp. 67672a.

Primary Examiner—Harry Wong, Jr.
Attorney, Agent, or Firm—Michael S. Striker

[57] ABSTRACT

A composition for cementing together metal parts which cures in the absence of air but the curing of which is inhibited by the presence of air comprises a mixture of A. 34.0 to 99.4 percent by weight of at least one acrylic acid- or methacrylic acid ester formed with an alcohol of the formula $R - C \equiv (CH_2OH)_3$ wherein R is alkyl with 1–4 carbon atoms in the main chain, $-CH_2OH$ or $-CH_2O-CO-C_nH_{2n+1}$ and wherein $n = 1 - 18$;

B. 0 – 65.4 percent by weight of
  a. at least one acrylic acid or methacrylic acid ester formed with an aliphatic alcohol of 4 – 10 carbon atoms in the molecule, or
  b. at least one acrylic acid or methacrylic acid ester formed with a glycol or a polyglycol;
  c. an unsaturated polyester; or
  d. a combination of two or more of the compounds at (a) (b) and (c);

C. 0.5 – 10 percent by weight of at least one organic hydroperoxide and

D. 0.1 – 5 percent by weight of a tertiary amine or an alkylated amide of formic acid or acetic acid.

The composition is adapted for cementing together particularly metal parts by self-curing upon exclusion of air while it is inhibited from curing as long as air or oxygen have access thereto.

10 Claims, No Drawings

SELF CURING ACRYLATE TYPE COMPOSITION FOR CEMENTING METAL PARTS

BACKGROUND OF THE INVENTION

Self-curing compositions that have been used heretofore in the machinery industry for providing a firm resin bond between metal particles usually have been acrylate type compounds of the general structure:

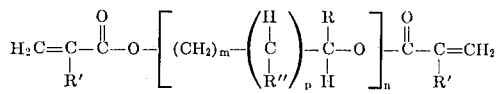

wherein R is —H, —CH$_3$, —C$_2$H$_5$, —CH$_2$OH or

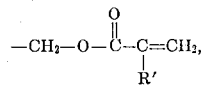

R' is —H, —Cl, —CH$_3$ or —C$_2$H$_5$, and
R'' is —H, —OH or

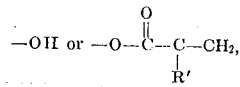

m in these formulas being at least 1 and preferably between 1 – 4, n being at least 2 and p being 0 or 1.

Another component of these compositions usually was a hydroperoxide initiator which either was added separately or was formed by reaction of oxygen with the monomer. Also present were accelerators such as tertiary amines, sulfimides, acidimides, formamide etc.

It is also known to form anaerobic curing mixtures on the basis of neopentylglycoldimethacrylate or -acrylate.

Another known method employs monoesters or mixtures of mono and diesters of acrylic acid or methacrylic acid formed with water soluble glycols to which organic hydroperoxides were added. In this last process of making self-curing mixtures which harden in the absence of air esters are used which are derived from acrylic acid or methacrylic acid and, on the other hand, cycloaliphatic alcohols. In these esters one or two methylene groups of the cycloaliphatic nucleus may be replaced by oxygen.

It is an object of the present invention to provide compositions for cementing together metal parts which are self-curing in the absence of air and provide for improved properties, particularly an improved bond between the metal surfaces adhered to each other.

SUMMARY OF THE INVENTION

The invention resides in a composition which is formed a mixture of

A. 34.0 to 99.4 percent by weight of at least one acrylic acid- or methacrylic acid ester formed with an alcohol of the formula R - C ≡ (CH$_2$OH)$_3$ wherein R is alkyl with 1 – 4 carbon atoms in the main chain, —CH$_2$OH or —CH$_2$O—CO—C$_n$H$_{2n+1}$ and wherein n = 1 – 18;

B. 0 – 65.4 percent by weight of
   a. at least one acrylic acid or methacrylic acid ester formed with an aliphatic alcohol of 4 – 10 carbon atoms in the molecule, or
   b. at least one acrylic acid or methacrylic acid ester formed with or a polyglycol;
   c. an unsaturated polyester; or
   d. a combination of two or more of the compounds at (a) (b) and (c);

C. 0.5 – 10 percent by weight of at least one organic hydroperoxide and

D. 0.1 – 5 percent by weight of a tertiary amine or an alkylated amide of formic acid or acetic acid.

DETAILS OF THE INVENTION AND PREFERRED EMBODIMENTS

The esters of acrylic acid or methacrylic acid used in the compositions of the invention may be mono-, di- or tri-esters of these acids with the corresponding alcohols. The preferred alcohols coming under the formula above given are trimethylolethane, trimethylolpropane, pentaerythritol, pentaerythrite monoacetate, pentaerythritol monolaurate, pentaerythritol monostearate, etc.

Preferred organic hydroperoxides are cumene hydroperoxide, di-isopropylbenzol hydroperoxide, pinane hydroperoxide, p-menthane hydroperoxide, cyclohexenylhydroperoxide, methylcyclohexenyl hydroperoxide, etc.

As the tertiary amine there may be used dimethylaniline, triethylamine, triethanolamine, trimethylamine, tributylamine, diethylaniline, triisopropanolamine, etc.

The acid amide may for instance be dimethylformamide or dimethylacetamide.

As esters of the acrylic acid or methacrylic acid with aliphatic alcohols there may for instance be employed octylmethacrylate, butylmethacrylate and 2-ethylhexylacrylate.

As esters of the acrylic or methylacrylic acid with a glycol and/or a polyglycol there may be used for instance glycol dimethyacrylate, dipropylene glycol diacrylate, polyethyleneglycoldimethacrylate or polypropyleneglycoldimethacrylate.

The term, "unsaturated polyesters" as used herein implies unsaturated resins which are the reaction product of (a) maleic or fumaric acid, phthalic acid anhydride, endomethylene tetrahydrophthalic acid anhydride, adipic acid, chlorotetrahydrophthalic acid, hexachloro endomethylene tetrahydrophthalic acid, etc. with (b) ethylene glycol, diethylene glycol, propylene glycol, etc.

The compositions of the invention can be made in a comparatively broad range of viscosities, curing speeds and strengths. The stability of the compositions under a cushion of air is more than one year. When placed between two clean metal surfaces the compositions of the invention undergo self-curing (hardening) in the absence of air or oxygen.

The mixture completely hardens at normal temperature on an iron surface within a few hours. The hardening process sets in after 10 to 20 minutes. It can be accelerators by an increased temperature or activation of the surface with solutions of metal soaps (Co, Fe, Mn, Cu, etc.).

The hardened layer forms a closely connecting cement between the two metal surfaces without play or clearance. Its slip resistance is up to 1960 newtons per square centimeter. The parts thus are adhered to each other in a slip-proof manner. The bond is stable up to 150° C. At temperatures above 250°C the connection may again be severed.

EXAMPLE 1

The composition in this example is formed by mixing 100 g trimethylolethane trimethacrylate and 3 g of 70 percent cumene hydroperoxide with 0.5 g of triethylamine. The viscosity of the composition thus obtained is 80 cP/20°C, the slip resistance is 1,125 newtons per square centimeter.

The strength of the bond is measured by means of a cylindrical steel body of 3 cm diameter and 1 cm length. The cylinder has a central bore of a diameter of 1 cm.

A cylinder of a length of 3 cm and a diameter of 0.995 cm is then introduced into the bore. This leaves a clearance of 0.025 mm after the introduction between the two adjacent surfaces. Before the inner cylinder is introduced a drop of the composition of the invention is applied to it. The cylinder is then placed into the bore and the composition is evenly distributed by revolved it about its axis. At normal temperature a mutual fixation of the two parts of the test instrument is obtained after 30 minutes. A complete firm bond is formed after 12 hours. The strength of the bonds is tested with a tensile apparatus by which the force necessary to expel one cylinder from the other is determined.

EXAMPLE 2

A composition was prepared by mixing 100 g of trimethylolpropane trimethacrylate which did not contain any inhibitor with 5 g of diisopropylbenzolhydroperoxide and 1 g of dimethylformamide. The viscosity of the composition thus obtained is 120 cP/20°C. The strength of the bond determined as described in Example 1 is 1030 newtons per square centimeter after 24 hours. The hardening process begins after 10 minutes.

EXAMPLE 3

A composition was formed by mixing 50 g of octylmethacrylate with 50 g of pentaerylthritol tetracrylate, 4 g cyclohexene hydroperoxide and 3.5 g dimethylaniline. The viscosity of the composition obtained is 30 cP/20°C. The strength of the bond determined in accordance with Example 1 after 24 hours is 295 newtons per square centimeter. The hardening begins after 10 minutes.

EXAMPLE 4

A composition was formed by mixing 30 g trimethylolpropane trimethacrylate with 20 g trimethylolpropanedimethacrylate, 50 g of an unsaturated polyester resin, 2 g cumene hydroperoxide and 1 g trimethylamine. The viscosity of the composition obtained was 560 cP/20° C. The bond determined as described in Example 1 was 1960 newtons per square centimeter after 24 hours. The hardening started after 20 min.

The polyester resin used in the above composition was poured by reducing 1 mol maleic acid anhydride, 1 mol phthalic acid anhydride and 2.1 mol diethyleneglycol until an acid number of 30 was obtained.

EXAMPLE 5

The composition of this Examples was obtained by mixing 70 g trimethylolpropane dimethacrylate with 20 g polyester resin as used in Example 4, 10 g ethylene glycoldiacrylate, 8 g cumene hydroperoxide and 4.75 g triethylamine. The viscosity of the composition obtained was 250 cP/20° C. The bond established in accordance with Example 1 was 1,275 newtons per square centimeter after 24 hours. The hardening set in after 10 minutes.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims:

1. A composition for cementing together metal parts which cures in the absence of air but the curing of which is inhibited by the presence of air, the said composition comprising a mixture of (a) between 34.0 and 99.4 percent by weight of at least one acrylic acid or methacrylic acid ester of an alcohol having the formula

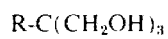

$$R-C(CH_2OH)_3$$

in which formula R is an alkyl radical having up to 4 carbon atoms, a methylol radical, or a radical having the formula

$$-CH_2O-CO-C_nH_{2n+1}$$

n being an integer up to 18, (b) between 0 and 65.4 percent by weight of at least one acrylic acid or methacrylic acid ester of an aliphatic alcohol having between 4 and 10 carbon atoms, or an acrylic acid or methacrylic acid ester of glycol or a polyglycol, (c) between 0.5 and 10 percent by weight of at least one organic hydroperoxide, and (d) between 0.1 and 5% by weight of a tertiary amine or an alkylated amide of formic acid or acetic acid.

2. The composition of claim 1 wherein the organic hydroperoxide is a member selected from the group consisting of cumene hydroperoxide, diisopropylbenzo hydroperoxide, pinane hydroperoxide, p-menthane hydroperoxide, cyclohexenylhydroperoxide, and methylcyclohexenyl hydroperoxide.

3. The composition of claim 1 wherein the tertiary amine is a member selected from the group consisting of dimethylaniline, triethylamine, triethanolamine, trimethylamine, tributylamine, diethylaniline and triisopropanolamine.

4. The composition of claim 1 wherein the alkylated amide is dimethylformamide or dimethylacetamide.

5. The composition of claim 1 wherein the acrylic acid or methacrylic acid ester formed with an aliphatic alcohol is octylmethacrylate, butylmethacrylate or 2-ethylhexylacrylate.

6. A composition as defined in claim 1 in which the mixture comprises (a) trimethylolethane trimethacrylate, (c) cumene hydroperoxide, and (d) triethylamine.

7. A composition as defined in claim 1 in which the mixture comprises (a) trimethylolpropane trimethacrylate, (c) diisopropylbenzene hydroperoxide, and (d) N,N-dimethylformamide.

8. A composition as defined in claim 1 in which the mixture comprises (a) pentaerythritol tetraacrylate, (b) octyl methacrylate, (c) cyclohexene hydroperoxide, and (d) N,N-dimethylaniline.

9. A composition as defined in claim 1 in which the acrylic or methacrylic acid ester (b) is glycol dimethacrylate, dipropylene glycol acrylate, polyethylene glycol dimethacrylate or polypropylene glycol dimethacrylate.

10. A composition as defined in claim 1 in which the mixture comprises (a) 50 parts of pentaerythritol tetraacrylate, (b) 50 parts of octyl methacrylate, (c) 4 parts of cyclohexene hydroperoxide, and (d) 3.5 parts of dimethylaniline, all parts being parts by weight.

* * * * *